United States Patent [19]

Constant

[11] 4,080,660
[45] Mar. 21, 1978

[54] DIGITAL SIGNAL TIME SCALE INVERSION

[76] Inventor: James Nickolas Constant, 1603 Danbury Dr., Claremont, Calif. 91711

[21] Appl. No.: 765,359

[22] Filed: Feb. 3, 1977

Related U.S. Application Data

[60] Division of Ser. No. 595,240, Jul. 11, 1975, Pat. No. 4,025,772, which is a continuation-in-part of Ser. No. 450,606, Mar. 13, 1974, abandoned.

[51] Int. Cl.² .......................... G06F 7/00; G06F 15/34
[52] U.S. Cl. ...................................... 364/715; 364/728
[58] Field of Search ........................ 235/152, 156, 181; 364/200, 900

[56] References Cited

U.S. PATENT DOCUMENTS

| | | | |
|---|---|---|---|
| 3,748,451 | 7/1973 | Ingwersen | 235/156 |
| 3,774,019 | 11/1973 | Cook | 235/181 |

Primary Examiner—David H. Malzahn
Attorney, Agent, or Firm—Harris, Kern, Wallen & Tinsley

[57] ABSTRACT

A system for digital signal processing, including a random access memory (RAM) accessed by counters and used for storing and shifting signals in a convolver, correlator, matched filter or multiplier. An input signal and a reference signal are applied from opposite ends of the device such that the signals scan past each other at a relative velocity with respect to each other for obtaining either the convolution or correlation function of signals. The RAM operates as a shift register delay line and provides time scale inversion of signals when desired.

5 Claims, 3 Drawing Figures

DIGITAL SIGNAL TIME SCALE INVERSION

CROSS REFERENCE TO RELATED APPLICATION

This is a division of application Ser. No. 595,240, filed July 11, 1975, now U.S. Pat. No. 4,025,772, which is a continuation-in-part of my copending application Ser. No. 450,606 filed Mar. 13, 1974 now abandoned.

BACKGROUND OF THE INVENTION

The present invention relates to signal processing using time compressors, time inverters, convolvers, matched filters, correlators and multipliers and more particularly to digital signal processing in which the signals are represented by a series of coded digits, for example digits found at the output of an analog-to-digital converter.

Special purpose digital equipment often needs to perform the computations of convolution, matched filtering, cross-correlation and the discrete Fourier transform. These transforms present an excessive computational load for a general purpose computer and a heavy load even for a digital computer structured for signal processing. For example, a straightforward linear transformation in a computer that takes a sequence of N data points into a sequence of N transform points made be regarded as a multiplication by a vector $N^2$ matrix. A direct implementation that uses a single multiplier requires $N^2$ multiplication times and $N^2$ words of storage. The Fast Fourier transform (FFT) offers some advantage in that it requires a number of multiplications proportional to $N \log_2 N$.

Signal processors are known in the art wherein convolutions, matched filtering, cross correlation and the discrete Fourier transform are computed in a general purpose computer or in a digital computer especially structured for signal processing. An example of a specially structured computer can be seen in U.S. Pat. No. 3,748,451. As noted previously however, such computations present excessive or heavy loads for such computers. As example, if the execution time of a digital computer which uses a software program is 10 microsecond/operation then the execution of a fast convolution in a serial processor is $N/100 \log_2 N$ milliseconds and this time becomes quite large even for modest values of N. Cascading, paralleling and arraying computers to shorten the execution time quickly increases the cost. As a consequence, while the computer using software has the potential it falls short in many applications which require short execution times and in many applications therefore which require operation in real time. The present invention is directed to a signal processor which can be obtained as a hardwired filter, i.e., utilizing all hardware means as opposed to computers usng software means. As a consequence, the present invention offers execution times on the order of 0.01 microsecond/operation or less and clearly extends the art to applications which cannot be serviced by the slower prior art using digital computers. In what follows therefore the term "prior art" will refer to devices other than digital computers using software, i.e., will refer only to hardwired filters.

A number of transform implementations are known in the hardwired filter art that have a simple serial data flow and a computation time proportional to N. These include convolution and correlation transforms and these are implemented using transversal filters as discussed in the paper by H. J. Whitehouse et al "High Speed Serial Access Linear Transform Implementations" Naval Undersea Center, San Diego, California 92132, January, 1973. In general, apparatus in the prior art fall into two broad categories; those employing acoustic and those employing non-acoustic means. Included in the former category are sonic, magnetostrictive, acoustic surface wave, and optoacoustic filters, while the latter category comprises charge coupled devices (CCD) and binary shift registers (BSR). Acoustic filters have been described in the paper by W. D. Squire et al "Linear Signal Processing and Ultrasonic Transversal Filters" appearing in the November, 1969 issue of IEEE Transactions on Microwave Theory and Techniques, while non-acoustic filters have been described in the paper by G. W. Byram et al "Signal Processing Device Technology" appearing in the Proceedings of the NATO Advanced Study Institute on Signal Processing held at the University of Technology, Loughborough, U. K. on 21 Aug. through 1 Sept., 1972.

As a rule, if interruptions of the processing are infrequent, the acoustic filters are preferred since they offer large storage capacity, convenient tapping of delay lines, and low power dissipation. When short duration interruptions of the signal processing may occur, CCD with their controllable clock rates offer the advantages of small size, offset only by charge transfer inefficiency and temperature sensitivity. When frequent processing interrupts are required, digital implementations in the form of shift registers are indicated. The rapid development of solid state technology however favors digital and these now are available commercially.

Digital implementations in the prior art have been obtained to compute the convolution and correlation transforms but are confined to the use of shift registers playing the role of delay lines. These are described in the paper by H. J. Whitehouse and in the paper by J. J. Buie and D. R. Brewer "A Larger Scale Integrated Correlator" appearing in the October, 1972 issue of IEEE Journal of Solid State Circuits, SC-7. Digital correlation systems using shift registers are also shown in U.S. Pat. Nos. to C. Pryor 3,303,335, to G. Bush et al 3,351,943, to G. Lindsay et al 3,670,151, to J. Stitt 3,717,756, to A. Croissieur et al 3,777,130 and to J. Alsup et al 3,831,013. Digital implementations of multipliers are described in the foregoing references and in the two articles by G. Kostopoulos "Serial-Serial Multiplication" and "Serial-Parallel Multiplication" appearing in the April, 1973 issue of Digital Design. All such devices can be assembled from conventional medium scale logic (MSL) or can be designed in large scale integrated (LSI) form.

The digital implementation of convolvers, matched filters, correlators, and multipliers in the prior art requires the storage of data in shift registers providing at least 2N words of storage and having N multipliers for the computation of the desired transforms. Shift registers however are limited in size and speed and many similar devices are needed if much data must be stored. Metal oxide substrate (MOS) registers while providing high density require extra power supplies and are slow-speed when used as bipolar shift registers. Shift registers notoriously sacrifice delay taps to obtain long lengths of their registers and to mantain compactness. In all cases, the length of registers determines their capacity and speed.

In many signal processing applications, the signals must be compressed in time. This is accomplished in the prior art by storing signals in an acoustic delay line and then retrieving them at a rate which is greater than the rate of storage as explained in the article by W. D. Squire. Of particular usefulness is the delay line time compressor (DELTIC) circuit which recirculates signals is a number of recirculations. The recirculation requires less length of delay line and is therefore a more efficient system. My copending applications Ser. No. 435,681 filed Jan. 23, 1974 now abandoned and Ser. No. 479,872 filed June 17, 1974, the latter application being a continuation-in-part of the former, now U.S. Pat. No. 3,950,635, and Ser. No. 609,342 filed Sept. 2, 1975, this last application being a division of application Ser. No. 479,872, teach the time compression of signals in a digital (non-acoustic) DELTIC circuit with RAMs in the role of delay lines. The terms DELTIC BSR, DELTIC RAM, DELTIC ROM, DELTIC PROM will be utilized throughout the disclosure to indicate the use of binary shift registers (BSR), random access memories (RAM), read-only memories (ROM), programmable read-only memories (PROM) and so forth as the delay line elements in a digital DELTIC circuit.

In general, the prior digital art using shift registers utilize 2N words of storage and employ N multipliers for performing the convolution or correlation transforms of signals. The present invention using RAMs as delay line elements requires 2N and in some cases only N words of storage and only one multiplier and in this manner provides new and improved convolvers, matched filters and correlators while significantly decreasing the weight, size, power consumption and cost for such devices. Moreover, the use of a digital DELTIC circuit with RAMs further enhances the invention over the prior art. As will be presently seen, the outstanding difference between the system of the present invention and the prior art is its ability to time-invert signals and to provide twice the resolution otherwise available.

A common deficiency in the prior art is in providing a fixed coded reference. For example, in a correlator one provides a coded reference signal (a fixed or stationary reference signal) while in a matched filter one provides coded hardware (fixed hardware responding to the incoming signal). A way to circumvent this difficulty is now available using the fact that if two signals are propagated from opposite ends of a delay line a convolution of the two signals occurs, as explained in the paper by C. F. Quate and R. B. Thompson "Convolution and Correlation in Real Time with Non-Linear Acoustics" appearing in the June, 1970 issue of Applied Physics Letters and in U.S. Pat. to C. F. Quate No. 3,760,172 . A convolver provides a reference signal which itself moves or scans by the incoming signal and can be electronically varied to provide a large number of reference signals in a single device. Otherwise, a large number of different devices would be necessary to process a variety of incoming signals. The technique for obtaining convolution therefore is very useful because one device is capable of carying out a large number of sorting functions on a large number of incoming signals. For example, a coded reference signal can be used to detect a coded input signal and the reference signal can be electronically varied thus freeing the design from a large number of coded hardware implementations which is quite common in the prior art. The convolution technique is clearly an important new method for signal processing and has been demonstrated in the prior art using both acoustic and digital (shift register) means. It offers twice the resolution of previous techniques and as mentioned already it offers electronic variation of the coded reference signal. Significantly however, in passive receiver applications, it offers the remarkable feature that the signal itself may be used as its own reference, i.e., an incoming signal generates its own matched filter. This is by virtue of the fact that a convolution of a signal $S(t)$ with its time-inversion $S(-t)$ is a matched filtering, i.e., providing maximum output response with respect to thermal noise. The present invention extends the convolution technique beyond the prior art by using RAMs, DELTIC RAMs, ROMs, PROMs and BSRs as the delay line elements in digital convolvers and correlators.

In the prior art, implementation of the convolution transform have been obtained using the non-linear interaction between two acoustic waves propagating through an acoustic delay medium as explained in the article by G. Kino and H. Mathews "Signal Processing in Acoustic Surface Wave Devices" appearing in the August, 1971 issue of IEEE Spectrum and in the article by G. Kino and J. Shaw "Acoustic Surface Waves" appearing in the September, 1972 issue of Scientific American. Non-linear acoustic processing involves putting two signals into a surface or bulk acoustic type delay line from opposite ends of the line which then responds as the convolution of the two signals and thus making it unnecessary to design a fixed coded reference signal into the line. In this manner one can vary the scanning coded reference signal at will and thereby perform a wide range of signal processing operations. This then can be accomplished in the Quate-Thompson apparatus which is a single acoustic delay device. A dual tapped acoustic delay line having 2N words of storage and N multipliers has been suggested in the article by C. E. Cock "Preferred Mode for the Quate-Thompson Non-Linear Acoustic Correlator Device" appearing in the August, 1971 issue of the Proceedings IEEE (Lett). The paper by H. J. Whitehouse suggests a dual digital delay line using shift registers and having 2N words of storage and N multipliers. A convolution system using either acoustic or shift register digital delay lines is discussed in U.S. Pat. to C. Cook No. 3,774,019.

From the discussion above it is clear that in the past, the implementation of a convolver has been accomplished using acoustic means or using digital shift registers playing the role of delay lines and, for all practical purposes, has not been made commercially available being confined mostly to the laboratory. Furthermore, the prior art for the digital implementation of convolvers, matched filters and correlators falls short when the capacity, speed, cost and size of shift registers are considered in devices which require high data throughputs.

It is an object of the present invention to provide a digital convolver, matched filter, correlator and multiplier using RAMs or DELTIC RAMs and capable of exceeding the performance of prior art digital devices using BSRs, at reduced weight, size and cost.

SUMMARY OF THE INVENTION

This invention provides both apparatus and method for the digital implementation of convolvers, matched filters, correlators and multipliers. A random access memory (RAM) accessed sequentially by a counter is utilized to perform the function of a delay line in a preferred configuration.

The general object of this invention is to provide small size low cost apparatus for the digital implementation of high-capacity high-speed convolvers, matched filters, correlators and multipliers. Utilizing the system of the present invention, the digital processing of signals may be accomplished efficiently and economically in real time.

A main object of this invention is to provide a digital convolver using a RAM in the role of a delay line. Another object of this invention is to use a digital DELTIC RAM in a digital convolver. Another object of this invention is to use a RAM to provide time-scale inversion of signals.

It is a further object of the invention to provide a digital convolver having twice the time resolution of existing correlation devices. Another object of the invention is to provide a digital convolver having an electronically varying reference signal. Another object of the invention is to provide a digital convolver wherein the incoming signal generates its own matched filter.

Further objects of the invention are to provide a number of configurations of the system and thereby to provide new and improved convolvers, matched filters, correlators and multipliers.

DESCRIPTION OF THE PREFERRED EMBODIMENTS

Figures 1, 4:
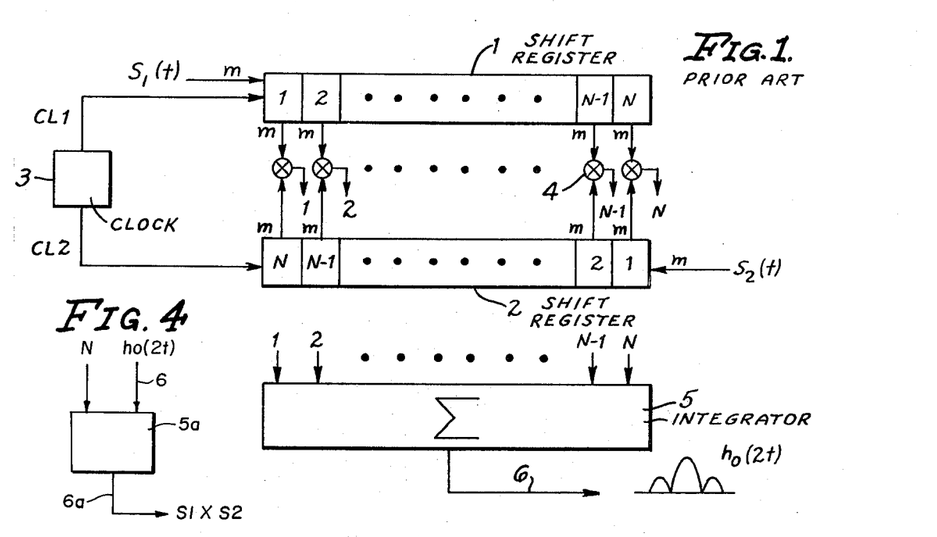
FIG. 1 ilustrates a convolver with dual shift registers in accordance with the prior art.
FIG. 4 illustrates a logic circuit which may be utilized in combination with the systems of FIGS. 1 and 2 to form a multiplier.

Referring to FIG. 1, a digital convolver in the prior art utilizes dual shift registers 1 and 2 each having N word capacity. Signals S1 and S2 are inputted to shift registers 1 and 2 from opposite ends and propagate therefore in opposite directions and at rates determined by clock 3 which provides clock signals CL1 and CL2 to shift registers 1 and 2. Shift registers 1 and 2 are arranged to play the role of delay lines. At each instant of time N outputs from each line are inputted to N multipliers 4 whose N outputs are inputted to summing network or integrator 5 whose output at 6 represents the convolution $h_o(2t)$ of signals S1 and S2.

In the convolver of FIG. 1, each multiplier 4 multiplies word $n$ of shift register 1 by its conjugate word $N+1-n$ of shift register 2. For example, word 1 of shift register 1 by word N of shift register 2, word 2 of shift register 1 by word N-1 of shift register 2, and so forth.

Typically, signals S1 and S2 have been digitized to $m$ level (bits) so that shift registers 1 and 2 in practice each comprise $m$ shift registers in parallel with corresponding pairs of registers 1 and 2 operating in parallel. If CCDs are employed or if a single bit word is used $m = 1$. Thus each shift register 1 and 2 outputs N words with $m$ bits per word and these are inputted to the N multipliers 4 which may therefore assume one of two forms; a field of N $\times$ $m$ separate multipliers each $fo$ multiplying at the word-bit level or, alternatively, N multipliers each for multiplying at the word level. This is all well known in the prior art and can be seen, for example, in the paper by H. J. Whitehouse. It should be noted at this point that there is no suggestion in the prior art for (1) using a RAM to play the role of a delay line, (2) using a DELTIC RAM to play the role of a delay line or, (3) time inverting signals. These particular implementations are unique features of the present invention.

In particular, it will be appreciated by those skilled in the art that the prior art, for example as shown in U.S. Pat. Nos. 3,670,151; 3,777,130; and 3,831,013, show systems which can be synthesized by using a device carrying out the operations diagramatically shown in FIG. 1 wherein individual weightings may be inserted in the lines leading from shift registers 1, 2 to the multipliers 4 or from the multipliers 4 to the integrator 5. It should be understood therefore that such well known techniques for implementing weightings can be carried out by the present invention equally as in the prior art.

Figure 2:
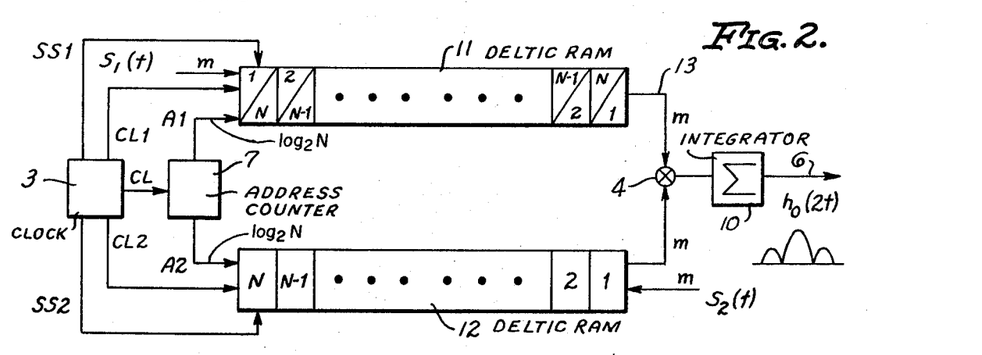
FIG. 2 illustrates a convolver with dual RAMs in accordance with the present invention.

Referring to FIG. 2, a first digital delay device 11 is used to store signals S1 in time while a second digital delay device 12 is used to store reference signals S2 in time. The signals are inputted from opposite ends and travel in opposite directions. Digital delay device 11 is in the form of a RAM or DELTIC RAM while digital delay device 12 may be any one of these forms or may be a BSR, DELTIC BSR, ROM, DELTIC ROM, PROM, DELTIC PROM, or simply a set of bipolar signals applied to one input of multiplier 4, the other input to multiplier 4 being provided by digital delay device 11. Thus digital delay devices 11 and 12 may be any one of a number of types, the exact type being determined by the application. No matter what the form, digital delay devices 11 and 12 play the role of serial-in serial-out shift register delay lines. When both digital delay devices 11 and 12 are specified to include RAMs it is necessary to have clock 3 for providing sampling signals SS1 and SS2 which may be needed for gating signals S1 and S2 into RAMs 11 and 12, clock signals CL1 and CL2 for enabling READ and WRITE commands in RAMs 11 and 12 and a clock signal CL which increments the address sequence of address counter 7 which in turn provides address signals A1 and A2 to RAMs 11 and 12. When digital device 12 is specified not to include RAM, for example as a BSR, then address signal A2 is not needed. Address signal A1 is always needed however since digital delay device 11 always includes a RAM. The output of multiplier 4 is inputted to a summing network or integrator 10 whose output at 6 represents the convolution $h_o(2t)$ of signals S1 and S2. Multiplier 4 may be in the form of $m$ EXCL OR gates. Integrator 10 may be in the form of a digital-to-analog (D/A) converter followed by a low pass filter.

Digital delay device 11 is used to store the N most recent samples of signal S1 while digital delay device 12 is used to store the N most recent samples of signal S2 in time. Signals S1 and S2 travel in opposite directions at speeds determined by clock rates CL1 and CL2. We can thus visualize digital delay device 11 as being a window which contains the N most recent samples of signal S1 while digital delay device 12 as being a window which contains the N most recent samples of signal S2. For each sampling of signal S1 inserted into digital delay device 11, N $m$-bit words are sequentially obtained at its output and these are multiplied in multiplier 4 with N corresponding $m$-bit words from digital delay device 12. Digital delay devices 11 and 12 are organized N words by $m$-bits and whichever the form, they are arranged to operate as serial-in serial-out shift register delay lines.

An analog signal which has, for example, been previously digitized to $m$ level (bits) appears on $m$ lines, where $m=1, 2, \ldots$, as signal S1 and is inserted into digital delay device 11 at the sampling inervals SS1. Between sampling intervals, the N most recent samplings of signal S1 are outputted from digital delay device 11 in sequence which is then inputted to multiplier 4. Typically, for a RAM specification of digital delay device 11, when CL1 is LOW, write enable lines in RAM 11 are enabled and the $m$-bit word which represents a sample of signal S1 is written into location 1 of RAM 11. When the clock CL1 goes HIGH, address counter 7 increments, selecting the next address A1 which appears on $\log_2 N$ lines. Address counter 7 increments N times, selecting the N locations of RAM 11 in sequence between samplings of signal S1. Thus N $m$-bit words are outputted from RAM 11 in sequence to multiplier 4, which also receives N corresponding $m$-bit words from digital delay device 12 which also plays the role of a delay line. An example of the use of a RAM in the role of a shift register delay line is given in the brief article by J. Springer, "High Speed shift registers use TTL RAMs to do all the shifting" appearing at page 146 of the Sept. 1, 1973 issue of Electronics Design.

Figure 3:
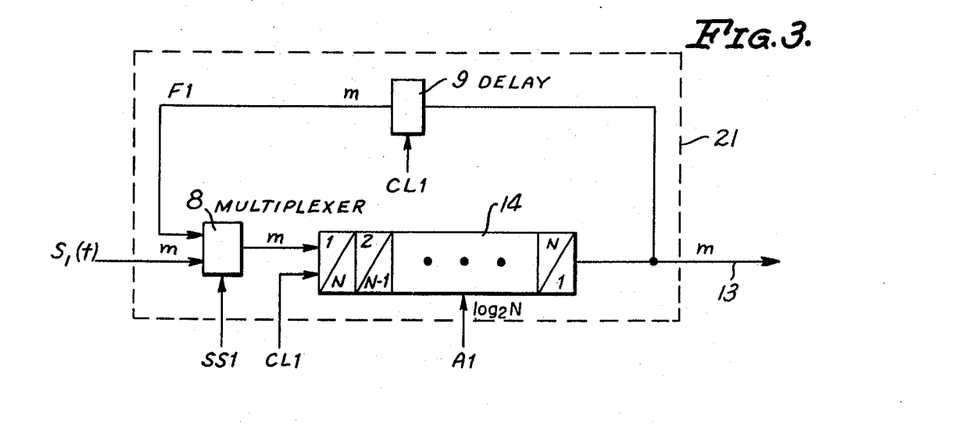
FIG. 3 illustrates a DELTIC RAM time compressor which may be utilized in place of the RAMs of FIG. 2.

Referring to FIG. 3, a time compressor 21 may be utilized to replace either or both digital delay devices 11 and 12 of FIG. 2. Time compressor 21 plays the role of a delay line and includes a digital delay device 14, multiplexer 8 and single word delay register 9. An analog signal, which has, for example been previously digitized to $m$ level, appears on $m$ lines, where $m=1, 2, \ldots$, as signal S1, and is gated through multiplexer 8 to digital delay device 14. Thus multiplexer 8 when commanded by sampling signal SS1 inserts signal S1 into digital delay device 14 which normally receives feedback signal F1 on each clock signal CL1. The sampling signal SS1 is at a rate N times less than the clock signal CL1 so that once signal S1 is sampled, the N locations of digital delay device 14 contain the N most recent samplings of signal S1. These are outputed in sequence between samplings of signal S1 and become the inputs to multiplier 4 together with the corresponding inputs from digital delay device 12. Typically, for a RAM specification of digital delay device 14, when clock CLS is LOW, write enable lines in RAM 14 are enabled and the signal S1 in the form of an $m$-bit word is written into the first location 1 of RAM 14. When the clock CLS goes HIGH, address counter 7 increments, selecting the next address A1 for location 2 of RAM 14 which appears on $\log_2 N$ lines. The $m$ line outputs from RAM 14 are fed back to the inputs of RAM 14 as feedback signal F1 through single word delay register 9 and multiplexer 8 which inhibits F1 only when signal S1 is being sampled. The signal which appears at the output 13 of RAM 14 is a compressed replica of signal S1. Although digital delay device 14 has been specified as a RAM in accordance with the system of the present invention it operates in the exact manner of a DELTIC BSR, for example the DELTIC recirculating shift register (ring counter) shown in the patent to C. N. Pryor. Thus while time compressor 21 is always a RAM or DELTIC RAM when replacing digital delay device 11, it can be specified as a DELTIC BSR, DELTIC RAM, DELTIC ROM, DELTIC PROM accordingly as digital delay device 14 therein is specified as a BSR, RAM, ROM, PROM when replacing digital delay device 12. The term DELTIC RAM is used to describe time compressor 21 using a RAM 14 as a shift register delay line. A DELTIC RAM has been disclosed more fully in my previously mentioned U.S. Pat. No. 3,950,635 and copending application Ser. No. 609,342, and reference may be had thereto for further information.

In FIG. 3 the data is compressed in time in a ratio N:1 in the circulating memory formed by the combination of digital delay device 14 and delay register 9. The circulating memory recirculates at the shift rate determined by clock signal CL1. A new word (sample) is inputted to digital delay device 14 at the sampling rate SS1 which is at a rate slower than the rate of clock signal CL1. Address signal A1 addresses word locations $1, 2, \ldots, N$ in sequence at the clock rate CL1 and is used only when digital delay device 14 is specified as a RAM, ROM or PROM. The new word occupies location 1 in digital delay device 14, the previous word (following a recirculation) shifts to location 2, and so forth so that the N most recent samplings of signal S1 are stored in digital delay device 14 between the samplings SS1. Specifically, when any location $n$ in digital delay device 14 (specified as a RAM) is addressed, the stored data at that location moves to the input of delay register 9 and the stored data in delay register 9 moves to the next location $n + 1$ in RAM 14. This procedure is identical as the locations are addressed in the sequence $1, 2, \ldots, N$ except when signal S1 is being sampled by sampling signal SS1, in which case multiplexer 8 blocks signal F1 from delay register 9 and passes signal S1 to RAM 14. It will be recognized by those skilled in the art that time compression of signal S1 in time compressor 21 is obtained in the identical procedure of a conventional DELTIC circuit, for example as described in the paper by M. Rosenbloom, "Using Time Compression Techniques in Digital Correlation" appearing in the Mar. 10, 1961 issue of Electronics and in the paper by V. C. Anderson, "The Deltic Correlator" appearing in Technical Memo 37, Acoustic Research Laboratory, Harvard University, Cambridge, Mass., January, 1965, and in the U.S. Pat. to C. N. Pryor No. 3,303,335, the difference being that while the conventional systems utilize acoustic delay lines and shift registers for implementing their systems, the present invention postulates the use of a digital delay device 14 in the form of a RAM operating as a shift register delay line.

In the following discussion regarding the system of FIG. 2, both digital delay devices 11 and 12 will be assumed to be DELTIC RAMs having the form of time compressor 21 although their exact specification will be determined by the application. With this assumption, both DELTIC RAMs 11 and 12 are accessed by address counter 7. On each clock CL, address counter 7 shifts one place thus selecting the next word in the N word sequence of DELTIC RAMs 11 and 12. The address cycle is completed after N shifts and is under the control of the clock 3 which also provides timing and sampling by way of clock signals CL1, CL2 and sampling signals SS1, SS2. An analog signal which has previously been digitized to $m$ level at the rate SS1 appears on $m$ lines as signal S1, while a second signal appears as the reference signal S2. The signals S1 and S2 are applied from opposite sides and travel in opposite directions at rates determined by the clocking rates CL1 and CL2. The clock, sampling, and address signals CL1 CL2, SS1, SS2, A1, A2 are determined by the application. Clock signals CL1 and CL2 are determined by the system capacity and speed. Sampling signals SS1 and SS2 are some frequency fraction of the clock rates CL1 and CL2 and generally are determined by sampling requirements for signals S1 and S2. Finally, address signals A1 and A2 are determined by the word size of RAMs 11 and 12.

On each shift of address counter 7, the information (N words) stored in DELTIC RAMs 11 and 12 are provided as inputs to multiplier 4 which may be in the form of an EXCL OR (exclusive OR) gate which then ORs the two inputs to produce signal coincidence or anticoincidence for each of the N products. Unlike the corresponding shift register implementation of FIG. 1 using dual serial-in parallel-out shift registers, the preferable system of the present invention is implemented using dual serial-in serial-out digital delay devices 11 and 12, most preferably in the form of RAMs and DELTIC RAMs. However, while the invention in a preferable configuration employs a DELTIC RAM for digital delay device 12, it will operate equally well using serial-in serial-out shift registers or CCDs, RAM, ROM or PROM for this element as the application warrants. It will be recognized by those skilled in the art that the present invention implements the convolver, matched filter and correlator preferably using RAMs in the role of delay lines. The theory and properties of prior art implementations in the form of transversal filters have been described in the reference by W. D. Squire et al while the prior art digital implementation of a convolver using serial-in parallel-out shift registers as transversal filters are described in the references by H. J. Whitehouse, G. W. Byram et al, J. J. Buie and D. R. Brewer. In summary, the present invention implements convolvers, matched filters and correlators in preferable configurations using RAMs.

Once laoded into their respective DELTIC RAMs 11 and 12, signals S1 and S2 may be exclusively ORed in multiplier 4 to produce the N convolution or correlation products in sequence at its output. The output of multiplier 4 may be integrated in integrator 10 whose output represents the convolution or correlation $h_o(2t)$ of signals S1 and S2. It should be understood in FIG. 2 that the operation of DELTIC RAMs 11 and 12 need not be identical. Thus when using the time compressor 21, the DELTIC RAM 14 continuously updates signal S1 by delaying signals in single word delay register 9 and multiplexer 8. No such delaying and multiplexing is required in DELTIC RAM 12 once this circuit has been loaded and is being used as a fixed reference. The single word delay register 9 and multiplexer 8, required for operation of DELTIC RAM 14 in a shifting recirculation mode (all samples shift to their next adjacent positions in a recirculation), are not needed and can be switched or bypassed once reference signal S2 has been loaded into DELTIC RAM 12 for use as a fixed reference, i.e., in a non-shifting recirculation mode (all samples return to their previous positions in a recirculation). A recirculation of course occurs for each sampling and insertion of a signal, S1 or S2, into its DELTIC RAM. 11 or 12.

It should be understood that address codes A1 and A2 are applied to DELTIC RAMs 11 and 12 on $log_2 N$. It should also be understood that signal S1 and reference signal S2 are applied on $m$ lines to their respective DELTIC RAMs 11 and 12, the outputs of which are also on $m$ lines.

Signals S1(t) and S2(t) are imputted (applied) to digital delay devices 11 and 12 so that the signals travel in opposite directions. It is preferable therefore to operate DELTIC RAMS A1 and A2 in a shifting recirculation mode. At each sampling interval, the N stored signals in DELTIC RAMs 11 and 12 are multiplied word-by-word, with word 1 of DELTIC RAM 11 multiplied by word N of DELTIC RAM 12, word 2 of DELTIC RAM 11 by word N−1 of DELTIC RAM 12, and so forth. The N products are sequentially obtained in multiplier 4 and are integrated in integrator 10 which provides an output $$h_o(2t) = \int S1(\tau) S2(2t - \tau)d\tau \qquad (1)$$

which represents the convolution of signals S1(t) and S2(t) and has the effect of having twice the resolution of devices in which one of the signals is stationary, namely $$h_o(t) = \int S1(\tau) S2(t - \tau) d\tau \qquad (2)$$

It will be appreciated that when replacing $S2(2t - \tau)$ and $S2(t - \tau)$ by their time-reverse functions $S2(-2t + \tau)$ and $S2(-t + \tau)$, equations 1 and 2 represent the correlations of signals S1 (t) and S2 (−t). Also, the convolution and correlation of signals are identical when the signals are time-symmetric.

In general, a convolver with signals S1 (t) and S2 (t) inputted from opposite ends of the device computes the convolution while a correlator with signals S1 (t) and S2 (t) inputted from the same end of the device computes the correlation. Examples of correlators may be found in the references by H. J. Whitehouse, G. W. Byram et al., J. J. Buie and D. R. Brewer. Inportantly however, it is possible to use a convolver as a correlator and vice versa. This becomes possible by inverting the time scale of one of the signals, say signal S1(t). In the prior art, the time inversion of signal S1(t) is accomplished prior to inputting this signal to digital delay device 11 as time inverted signal S1(−t). For example see the time inversion device suggested in the reference by C. Cook. It will be appreciated that once signal S1(t) has been inputted to digital delay device 11, it is impossible to obtain a time scale inversion using the apparatus and method of the prior art but this can be easily accomplished by specifying digital delay device 11 to be a RAM or DELTIC RAM in accordance with the system of the present invention. This unique feature of the present invention becomes possible since a Ram operates on separate WRITE-READ cycles and these can be addressed separately by address counter 7. Consequently, while signal S1(t) can be applied (written) into RAM 11 in the time sequence 1, 2, . . . , N, it need not necessarily be taken (read) from RAM 11 in this sequence but may be taken in any sequence including the time inverse sequence N, . . . , 2, 1.

In FIG. 2 each word bin of digital delay device 11 indicates this flexibilitty of RAM 11 to read out its contents in the same or in the time inverse sequence from that which the contents have been written into RAM 11. The numbers appearing in the upper left hand portions of each word bin represent the time sequence 1, 2, . . . , N at which samples of signal S1 can be written into DELTIC RAM 11. While the samples of signals S1 stored in DELTIC RAM 11 may also be read out to multiplier 4 in this same time sequence, they may also be read out in the time inverse sequence K, . . . , 2, 1 and this is indicated by the numbers appearing in the lower right hand portions of each word bin. Thus the time inversion of signal S1(t), in the preferred manner of the present invention, may be accomplished after signal S1(t) has been inputted to digital delay device 11 by multiplying the signals word-by-word, with word 1 of RAM 11 multiplied by word 1 of RAM 12, word 2 of RAM 11 by word 2 of Ram 12, and so forth. In this manner, the convolver of FIG. 2 performs the function of a correlator. In like manner, it is easy to show that a correlator can be used to perform the function of a convolver. All that is needed is to specify digital delay device 11 as a RAM or DELTIC RAM.

In summary, the convolver of FIG. 2 when reading the contents of RAM 11 in the time sequence 1, 2, ..., N results in a convolution computation, while when reading the contents of RAM 11 in the time inverse sequence N, ..., 2, 1 results in a correlation computation.

In the foregoing it has been assumed that the contents of RAM 12 are being read in th time inverse sequence N, ..., 2, 1. To obtain the correlation function in a correlator, signals S1(t) and S2(t) are applied to the same end of the device such that one or both signals propagate in the same direction. It will be appreciated that when both signal propagate in a correlator, the two signals must travel at unequal speeds to effect the correlation function. However, unequal speeds of signals results in signals not being spatially commensurate within the correlator and the resulting correlation is effectively between dissimilar signals, thus not providing a correlation output as previously suggested. To obtain the correlation function in a convolver, signals S1(t) and S2(t) are applied to opposite ends of the device, for example as shown in FIG. 2, so that the signals propagate in opposite directions in digital delay devices 11 and 12. It will be appreciated that when the two signals S1(t) and S2(t) are applied to the convolver of FIG. 2 with time inversion of S1(t), the two signals must travel at equal speeds to effect the correlation function and halving of the time dimension of the output signal.

While the correlation function is the most desirable for providing the maximum signal-to-noise ratio, the convolver function is the most desirable for providing halving of the time dimension of the output signal. As a consequence, the time scale of one of the two signals, say signal S1(t), must be inverted in the convolver if a correlation computation is to be obtained. In the prior art, time inversion is accomplished by first inputting signal S1(t) to a time-scale inverter whose output is the time inverted signal S1(−t) which is then applied to the convolver. While this technique may be utilized in the system of the present invention, the time scale inversion of signal S1(t) may also be obtained by first inputting signal S1(t) into digital delay device 11, in the form of a RAM, in the time sequence 1, 2, ..., N and reading the signal S1(−t) out in the inverse time sequence N, ..., 2,1. The latter technique is a preferred technique since it eliminates the use of a special time seal inverter apparatus external to the convolver as required in the prior art. This then is a unique feature of the present invention which specifies digital delay device 11 as a RAM or as a DELTIC RAM, i.e., a DELTIC circuit using RAM as a delay line as has been more fully described in my U.S. Pat. No. 3,950,635 and in my copending application Ser. No. 609,342. Thus RAM 11 not only operates as a serial-in serial-out shift register delay line but also offers the flexibility of providing time scale inversion of signals in applications where signals S1(t) and S2(t) are not even and symmetric. It will be appreciated that there is no suggestion of apparatus or method in the prior art for performing the dual task of a digital delay line while at the same time providing for time scale inversion of signals.

As is well known, the convolution between two signals is of a smaller magnitude than the correlation between the two signals and thus is not as useful a function as correlation for many signal processing applications. However, a correlation function can be obtained in a convolver, or vice versa, simply by inverting the time scale of one of the two signals, say using signal S1(−t) instead of signal S1(t). Thus all that is needed to obtain a correlation function in the convolver of FIG. 2 is to use the signal S1(−t) instead of signal S1(t) as shown. It will be appreciated that in many applications where signals S1(t) and S2(t) are even and symmetric functions, the convolution and correlation functions provide identical results except that halving of the time scale of the output signal occurs if a convolver is used. Generally, however, many signals in practice do not exhibit this kind of symmetry so that the convolution and correlation functions do not result in the identical magnitude of output signals. For these types of signals, the correlation output is more desirable of the two for providing maximum signal-to-noise ratios while the convolution output is the most desirable for halving the time scale of the output signal. Unlike the prior art, the internal time-scale inversion feature of the present invention obtains both benefits i.e., it permits operation of the convolver of FIG. 2 as a correlator with the benefit of the highest signal-to-noise ratio and as a convolver for halving of the time-scale of the output signal.

It will be appreciated that it is always possible to operate a convolver or correlator as a stationary or scanning reference device, for example with reference signal S2 stationary in digital device 12 (signal S2 is coded into the hardware and never changes or RAM 12 operates in a non-shifting recirculation mode) and with signal S1 scanning (propagating in digital delay device 11 or RAM 11 operating in a shifting recirculation mode) or, with each of signals S1 and S2 scanning with respect to the device. However, while it is never possible to halve the time scale of the output in a correlator (whether stationary or scanning reference) or in a stationary convolver, this is indeed possible in a scanning reference convolver. A convolver has this interesting property of offering twice the resolution of a correlator by virtue of the fact that the two signals may be made to scan past each other in opposite directions, while in a correlator the scanning of signals in the same direction produces to such betterment of its resolution. A derivation of this fact can be seen in the reference by G. Kino and P. Matthews. For many applications, the scanning reference convolver is the most desirable of the two devices to provide halving of the time scale dimension of the output signal, i.e., to increase the system resolution by a factor 2. Since the correlation function is desired to provide the maximum signal-to-noise ratio, it is clear that a scanning reference convolver for computing the correlation function provides both double the resolution and maximum signal-to-noise ratio, both results not being possible otherwise. This is all well known in the prior art and can be seen, for example, in the reference C. Cook. However, it is with regard to the improvement in the apparatus and method of digital delay devices 11 and 12 when using RAM to both operate as delay lines and for providing time scale inversion of signals, wherein the present invention distinguishes the prior art.

A comparison of the prior art exemplified by FIG. 1 and the present invention exemplified by FIG. 2 indicates the preferred use of shift register delay lines in the former and the preferred use of RAMs operating as shift register delay lines in the latter. While both systems compute the convolution transform thereby providing halving of the time scale of the output signal, the latter system is the more desirable in applications where both high resolution and high response are desired. This can be easily accomplished in the present invention by suitably programming address counter 7 to provide address commands which are appropriate to the application. Address counter 7 provides a sequence of READ-WRITE commands A1 to RAM 11 between samplings of signal 11. Without time inversion N such commands A1 are provided with each command A1 addressing the same location of RAM 11 for both the READ and WRITE commands, while with time inversion each command A1 addresses conjugate locations of RAM 11. Thus without time inversion, address counter 7 provides commands A1 in sequence for reading and writing signal S1 from and to RAM 11 in the same time sequence 1, 2, ..., N, while with time inversion address counter 7 provides commands A1 in sequence for writing samples of signal S1 into RAM 11 in the time sequence 1, 2, ..., N and reading stored samples of signal S1 in the time inverse sequence N, ..., 2, 1.

The address sequence that is necessary to input and retrieve data from RAM 11 is provided by address counter 7 which is incremented sequentially through its address sequence by clock signal CL provided by clock 3. To perform a convolution, N current samples of signal S1 are inserted into RAM 11 in the address or time sequence 1, 2, ..., N while the N stored samples of signal S1 (stored during the previous sampling interval or cycle) are outputted to one input of multiplier 4 in the time sequence 1, 2, ..., N during each interval between samplings of signal S1. The other input of multiplier 4 is provided by RAM 12 in the inverted address or time sequence N, ..., 2, 1 so that word 1 of RAM 11 is multiplied by word N of RAM 12, word 2 of RAM 11 by word N-1 of RAM 12, and so forth. The resulting N products S1 ($\tau$) S2($2t - \tau$) between samplings of signal S1 from multiplier 4 are inputted to a D/A converter and analog integrator 10 whose output is the convolution $h_o(2t) = \int S1(\tau) S2(2t - \tau) d\tau$.

To perform a correlation, N current samples of signal S1 are inserted into RAM 11 in the address or time sequence 1, 2, ..., N, while the N stored samples of signal S1 (stored during the previous sampling interval or cycle) are outputted from RAM 11 to one input of multiplier 4 in the inverse address or time sequence N, ..., 2, 1 during each interval between samplings of signal S1. The other input of multiplier 4 is provided by RAM 12 in the address or time sequence N, ..., 2, 1 so that word N of RAM 11 is multiplied by word N of RAM 12, word N-1 of RAM 11 by word N - 1 of RAM 12, and so forth. The resulting N products S1 ($\tau$) S2 ($-2t + \tau$) between samplings of signal S1 from multiplier 4 are inputted to a D/A converter and analog integrator 10 whose output is the correlation $h_o(2t) = \int S1(\tau) S2(-2t+\tau) d\tau$.

To obtain a matched filter electronically, the signal S1 is fed into both inputs of the convolver in FIG. 2 and time inversion is obtained, i.e., the system is operated as a correlator, as discussed previously, but with S1 = S2, i.e. physically connecting both inputs to the signal source S1. The output of integrator 10 for the electronic matched filter is the auto correlation $h_o(2t) = \int S1(\tau) S1(-2t + \tau) d\tau$. Of course a fixed (non-electronic) matched filter can be obtained by specifying digital delay device 12 as a ROM, PROM, or as a set of fixed voltages (zeros and ones) forming the set of N word samples of signal S2.

It should be understood that signals S1 and S2 are applied on $m$ lines, $m = 1, 2, \ldots$, to their digital delay devices 11 and 12 the outputs of which are also carried on $m$ lines. Address codes A1 and A2, when used, are applied to digital delay devices 11 and 12 on $\log_2 N$ lines. The integration of N serial products outputted from multiplier 4 can be accomplished in any one of a number of ways, for example by specifying multiplier 4 as $m$ EXCL ORs each followed by a digital-to-analog converter and low pass filter 10 whose output is the convolution $h_o(2t)$. Alternatively, multiplier 4 can be specified as an $m$ word by $m$ word multiplier whose N outputs per sampling cycle can be integrated in a single low pass filter 10 (simple RC network, digital adder, counter, and so forth).

The system of the present invention can be operated also as a fixed or programmable matched filter or correlator. When used as a matched filter, one of the signals, S1 or S2, serves as a stationary reference (signal is coded into the hardware or a digital delay device is used operating in a non-shifting recirculation mode). The reference signal is coded or loaded into its respective digital delay device and left undisturbed for the duration of the required processing. However, the system of the present invention is particularly suited for applications in which the reference signal must frequently be changed. The change is made by using a scanning reference (digital delay device 12 is used operating in a shifting recirculation mode) and is made by electronically varying the reference signal prior to its being used in its digital delay device. In this mode of its operation the present invention constitutes an electronically programmable matched filter. A convolution results when signals S1 and S2 are inputted from opposite ends of the device without time scale inversion; word 1 of signal S1 is multiplied by word N of signal S2, and so forth. A correlation results when signals S1($-t$) and S2($t$) are inputted fronm opposite ends of the device, i.e., the time scale of siganl S1 is inverted prior to its being inputted to digital delay device 11 word N of signal S1($-t$) as multiplied with word N of signal S1 ($t$), and so forth. A correlation also results, in the preferred manner of the sytem of the present invention, when signals S1 and S2 are inputted from opposite ends of the device without time scale inversion, as shown in FIG. 2, and word 1 of signal S1 is multiplied by word 1 of signal S2, and so forth, to obtain the desired time scale inversion of signal S1 without the need of external apparatus.

In mathematical terms, the process of convolution in a convolver is described by equation 1 while the process of correlation in a correlator is described by equation 1 with S2($-2t + \tau$) replacing S2($2t - \tau$). The hardware implementations of convolvers and correlators while appearing alike, are distinct and different; signals S1 and S2 are inputted from opposite ends of a convolver and from the same end in a correlator. Except for halving the time scale of output signals, the correlator generally provides the highest signal-to-noise ratio. Thus one needs a convolver with the performance of a correlator and this is just what is provided by the system of the present invention. While it is always possible to obtain a convolution in a correlator it is less desirable since the correlator will not provide halving of the time scale of output signals. Using either type device, an incoming signal can be used to generate its own reference signal since if $S2(t) = S1(-t) = S1*(t)$, where the asterisk denotes a complex conjugate, the result is a matched filter by definition, i.e., equation 1 becomes the equation for a matched filter. Clearly then the capability to invert signals permits operation of the present invention as a matched filter.

As just noted, a matched filter obtains when $S2(t) = S1(-t)$. Thus the matched filter implementation of the system of the present invention forms the cross correlation between the input signal $S1(t)$ and its time inverse $S1(-t)$. As with the prior art, a matched filter can also be obtained by coding the hardware so that $S1(t) = E1(-t)$ where E1 is an estimate of S1. If the input signal S1 is the same as the estimate signal F1, the output would be the auto correlation function. Thus while the prior art must code its hardware to obtain a matched filter, the present invention offers the additional choice of utilizing the incoming signal to form its own matched filter electronically.

In the prior art, the difference between a matched filter and a correlator is in the way a reference signal, say S2, is implemented for processing incoming signal S1. If S2 = E1 is built into the hardware, i.e., coded into the system, it becomes a matched filter, while if S2 is applied electronically it becomes a correlator. In the system of the present invention S2 can be coded into the hardware, for example by specifying digital delay device 12 as a set of bipolar signals (positive and negative voltages applied sequentially to multiplier 4), or can be applied electronically, for example by specifying digital delay device 12 as a BSR, RAM, DELTIC RAM, ROM, DELTIC ROM, PROM, DELTIC PROM, and so forth.

Any one of the many possible modes of operation and forms suggested by FIGS. 2 and 3 will produce the convolution $h_o(2t)$ of signals S1 and S2. For example consider FIG. 2 in which digital delay devices 11 and 12 are DELTIC RAMs as shown in FIG. 3 and as described more fully in my U.S. Pat. No. 3,950,635 and in my copending application Ser. No. 609,342. When address counter 7 under control of clock 3 has gone through its full N word count cycle, the same DELTIC 11 and 12 locations will be addressed again, and the data stored during the last access of these locations will be read out as an N word sequence. The procedure may be as follows: first, store signals S1 and S2 in DELTIC RAMs 11 and 12; second, multiply stored signals S1 and S2 in a multiplier 4, for example in an EXCL OR gate, m bit word 1 of DELTIC RAM 11 by m bit word N of DELTIC RAM 12, word 2 of DELTIC RAM 11 by word N-1 of DELTIC RAM 12, and so forth, the N multiplications proceeding serially in time; and third, integrating the N serial products in an integrator 10. This procedure produces the convolution $h_o(2t)$ of signals S1 and S2. In yet other configurations, digital delay device 12 may take any one of a number of forms including BSR, RAM, and so forth. Appropriate technologies for implementing digital delay devices 11 and 12 include transistor-transistor logic (TTL), charge coupled device (CCD), emitter coupled logic (ECL), and so forth. Whatever the choice for digital delay devices 11 and 12, each forms an N × m memory plane under control of clock 3 and clock signals CL1 and CL2 or under control of clock 3 and clock signals CL, CL1, CL2 and address counter 7 providing address signals A1 and A2 if access is random. Any one of these devices can be assembled from discrete conventional medium scale logic (MSL) or can be designed in large scale integrated (LSI) form.

It should be recognized that the system of the present invention can be operated as a multiplier. It should be appreciated that while multiplier 4 can be implemented as a conventional serial-serial, serial-parallel or parallel-parallel digital multiplier, for example as suggested in the reference by Kostopoulos, a much simpler way is to implement multiplier 4 as a set of m EXCL OR gates. In this form the system of FIG. 2 can be used as a multiplier for computing the product $S1(\tau) S2(\tau)$. This product occurs normally when the convolver is operated as a correlator, as discussed previously, and when $t = 0$. Thus, signals S1 and S2 can be loaded into DELTIC RAMs 11 and 12 (each operating in a shifting recirculation mode) and, once loaded, can be read from DELTIC RAMs 11 and 12 (each operating in a non-shifting recirculation mode) to provide the product $S1(\tau) S2(\tau)$ at the output of multiplier 4. For this implementation of a multiplier, wherein two known signals S1 and S2 are already lined up in time ($t=0$), the integrator 10 is not needed. However, when signals S1 and S2 must first be lined up in time, i.e., correlated before their product is computed, then integrator 10 will be needed in combination with means having input the input and output of integrator 10, i.e., input signals $S1(\tau) S2(-2t + \tau)$ and output signal $h_o(2t)$, and providing at its output the product $S1(\tau) S2(\tau)$. Since the output of integrator 10 becomes $h_o(0)$ when $t=0$, this particular condition can be utilized to obtain $S1(\tau) S2(\tau)$ from the output of multiplier 4 and representing the product of signals S1 and S2. Thus the product $S1(\tau) S2(\tau)$ of signals S1 and S2 can be obtained from the group of products $S1(\tau) S2(-2t + \tau)$ normally appearing at the output of multiplier 4 by recognizing the particular condition $h_o(0)$ at the output of integrator 10. This can be accomplished in any one of a number of ways, visually or automatically. For example, the output $h_o(2t)$ from integrator 10 can be observed on a visual display to obtain the condition $h_o(0)$ which, for correlation function, can be recognized as the maximum value assumed by the correlation function $h_o(2t)$ taken over some appropriate period of time T, say the time length of signal S1. The condition $h_o(0)$ can also be obtained automatically, for example by thresholding the correlation function $h_o(2t)$ in a simple voltage threshold circuit or differentiating $h_o(2t)$ in a differentiator to obtain its maximum value $h_o(0)$. Once signal $h_o(0)$ is obtained at $t = 0$ it can be used to gate a switch having input the product $S1(\tau) S2(-2t + \tau)$ and providing output the product $S1(\tau) S2(\tau)$. The switch is normally open but closes when $h_o(0)$ occurs to effect its closing. Thus simple means, for example, comprising a voltage threshold circuit or differentiator and an electronic switch may be included in integrator 10 with said means having input the input $S1(\tau) S2(-2t + \tau)$ and output $h_o(2t)$ of integrator 10 and providing at its output the desired product $S1(\tau) S2(\tau)$ at $t = 0$. Such means may comprise a logic circuit 5a having as input the N inputs appearing at the input of integrator 10 and also having as input the response $h_o(2t)$ appearing at the output 6 of integrator 10 and providing at its output 6a the product of signals S1 × S2 when $t = 0$, for example logic circuit 5a in FIG. 4 may be utilized in FIG. 2 of the present invention as well as in the prior art.

The distinguishing features of the present invention are its computation of the convolution transform of two signals in a configuration which uses 2N words of storage (digital delay devices 11 and 12) and a single mulitplier (multiplier 4). Its unique features are (1) its use of RAM means, (2) its use of DELTIC circuits, (3) its capability to invert the time scale of input signals, (4) its capability for halving the time scale of output signals, (5) its flexibility for providing electronically variable reference signals, (6) it provides its own reference signal, and (7) provides above at significant weight, size, power and cost savings. These features provide new and improved apparatus and method over the prior art and result in the significant reduction of hardware and increase in speed for implementing convolvers, matched filters, correlators and multipliers.

It should be recognized that even further hardware reductions are possible in certain applications. In general, when signals are different, i.e., when $S2 \neq S1$, both digital delay devices 11 and 12 are needed to store signals but when the signals are the same, i.e., when $S1 = S1$, digital delay device 12 becomes redundant since the same signal need only be used and thus can be obtained from digital delay means 11. Thus when $S2 = S1$, the system need not implement digital delay means 12, using only the information stored in digital delay means 11 to compute the convolution and correlation transforms.

In many applications it is desirable to combine the central control afforded by a general purpose computer with the efficiency and economy provided by special purpose signal processing devices. Such applications might require operations which include convolution to obtain high resolution between closely spaced signals, matched filtering for echo ranging or for coherent communications systems, cross correlation for interferometric analysis or for signal identification, spectrum analysis for passive detection and classification, and multiplication for general linear transformations on data vectors. Convolvers, matched filters, correlators, and multipliers are special purpose signal processing devices which perform linear, bilinear, and non-linear operations at rates far in excess of the capabilities of large general purpose computers. Their applications include and are well suited for the high resolution of signals (convolver), the detection of signals (matched filter), the identification of signals (correlator) and the multiplication of signals (multipliers). Options for the implementation of these devices presently include acoustic means and nonacoustic means in the form of serial-in parallel-out shift registers, their full potential being limited by the mechanical efficiency and economic availability of practical hardware. In this last respect digital means in particular offer outstanding practical implementations in many applications and have already found use in such sophisticated signal processing tasks as bit synchronization, bit detection, error correction, coding, pulse compression, synthetic aperture processing and other applications. The present invention now provides an expanded range of digital means for the computation of the convolution and correlation transforms and thereby further extending the range of applications for the technical efficiency and economic availability for such devices. In particular, the system of the present invention is expected to make significant reductions in the cost and complexity of such devices while increasing the speed of detecting signals buried in noise and the substantial reduction in the amount of computer power in applications using radar, sonar and the telecommunications areas of TV and mobile radio.

Although a particular configuration of a digital convolver, matched filter and correlator have been described, it should be understood that the scope of the invention should not be considered by way of illustration but rather by the appendant claims.

I claim:

1. In a system for the digital time scale inversion of signals, the combination of:
   digital delay means having a random access memory for storing signals in a first time sequence, said memory having storage locations for N words;
   an address counter connected to said memory for addressing the N storage locations in a sampling interval providing N outputs from the memory in a second time sequence, with said second time sequence from the output of said memory being one of the time sequence or time-reverse sequence of said first time sequence; and
   clock means connected to said memory and to said address counter for controlling timing operations of said memory, including means for shifting said memory afer each sampling interval.

2. The system of claim 1 wherein said memory includes one of a TTL, CCD, and ECL.

3. The system of claim 1 wherein said random access memory comprises a DELTIC circuit.

4. A method for the digital implementation of signal time scale inversion, including the steps of:
   storing signals in a first time sequence in a random access memory having storage locations for N words;
   addressing storage locations of the memory in a sampling interval providing N outputs from the memory in a second time sequence, with said second time sequence from the output of said memory having one of the time sequence or time-reverse sequence of said first time sequence; and
   shifting the signal in the first memory after each sampling interval.

5. The method of claim 4 including storing the signal in a random access memory comprising a DELTIC circuit.

* * * * *